FIG. I.

Nov. 15, 1966 S. W. SOOS 3,286,211
FRICTION-CLUTCH TYPE MECHANISM FOR OPERATING
CIRCUIT INTERRUPTERS
Filed Nov. 27, 1964 5 Sheets-Sheet 3

WITNESSES:
John L. Clopp
James H. Young

INVENTOR
Steven W. Soos
BY
William A. Clerik
ATTORNEY

United States Patent Office 3,286,211
Patented Nov. 15, 1966

3,286,211
FRICTION-CLUTCH TYPE MECHANISM FOR OPERATING CIRCUIT INTERRUPTERS
Steven W. Soos, Bedford, Ohio, assignor to Westinghouse Electric Corporation, Pittsburgh, Pa., a corporation of Pennsylvania
Filed Nov. 27, 1964, Ser. No. 414,220
7 Claims. (Cl. 335—68)

This invention relates generally to mechanisms for operating circuit interrupters and more particularly to motor operating mechanisms for operating circuit interrupters.

A general object of this invention is to provide an improved mechanism for operating circuit interrupters.

Another object of this invention is to provide an improved top-mounted type motor operating mechanism for operating circuit interrupters.

In the art of motor operating mechanisms for circuit interrupters or circuit breakers, it is desirable to provide friction-type coupling means in the mechanism, which coupling means will slip when the interrupter handle reaches the operated position to thereby prevent damage to the handle. With the provision of friction coupling means, the motor operating mechanism can be constructed to drive a greater distance than the handle travel of the circuit interrupter. Thus, the driving distance of the mechanism is less critical so that the mechanism can be field mounted to operate variety of different circuit interrupters.

Accordingly, another object of this invention is to provide an improved motor operating mechanism comprising a friction-type coupling means that slips whenever the torque required to operate the driven structure exceeds a predetermined value.

Another object of this invention is to provide an improved top-mounted type motor operating mechanism for operating circuit interrupters with means provided to enable manual operation of the circuit interrupters.

A further object of this invention is to provide an improved combination comprising a circuit interrupter and a mechanism for operating the circuit interrupter.

The novel features that are considered characteristic of this invention are set forth in particular in the appended claims. The invention itself, however, both as to structure and operation, together with additional objects and advantages thereof, will be best understood from the following detailed description when read in conjunction with the accompanying drawings, in which:

Figure 1:
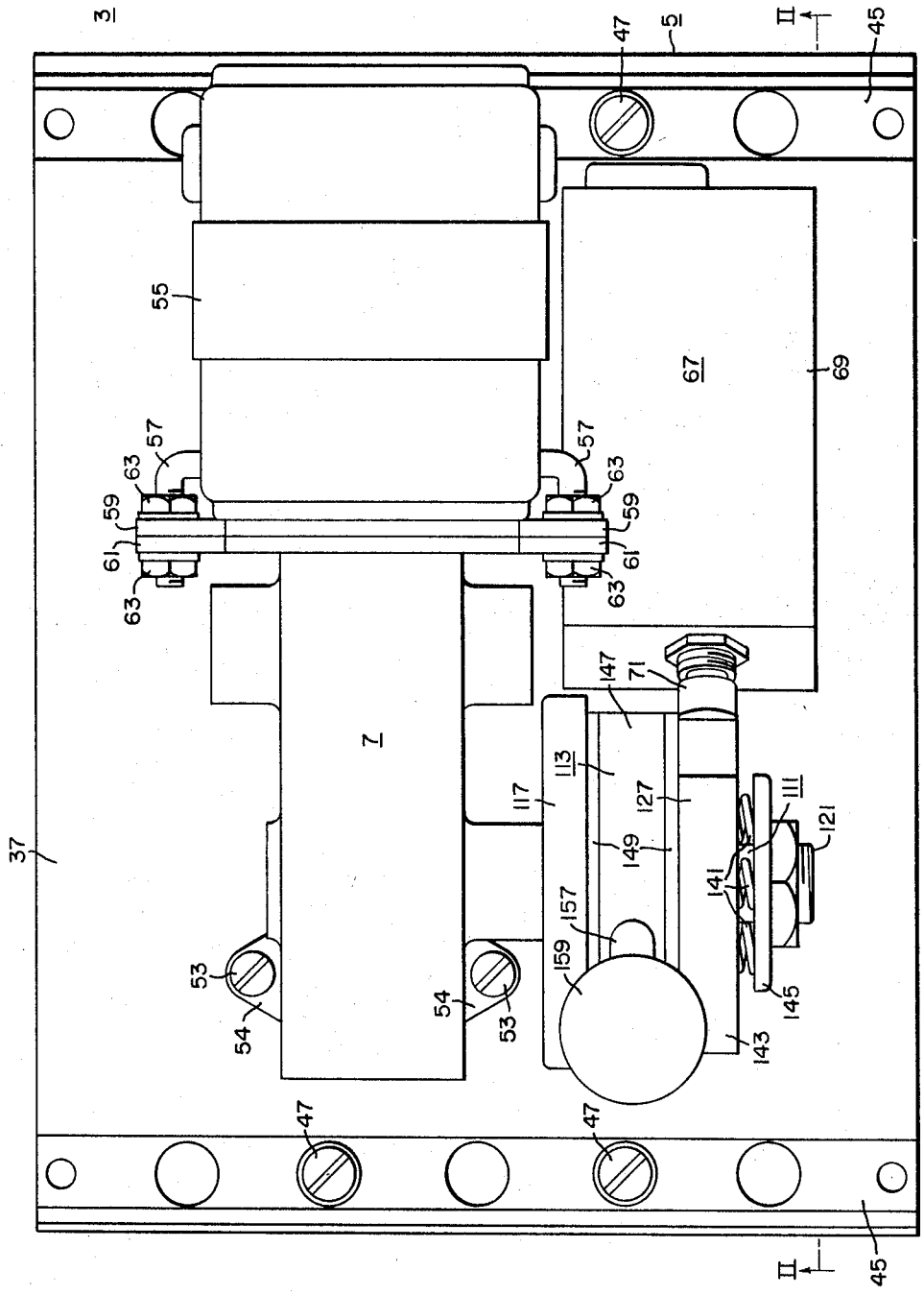
FIGURE 1 is a plan view of a circuit interrupting structure constructed in accordance with principles of this invention.
Figure 2:
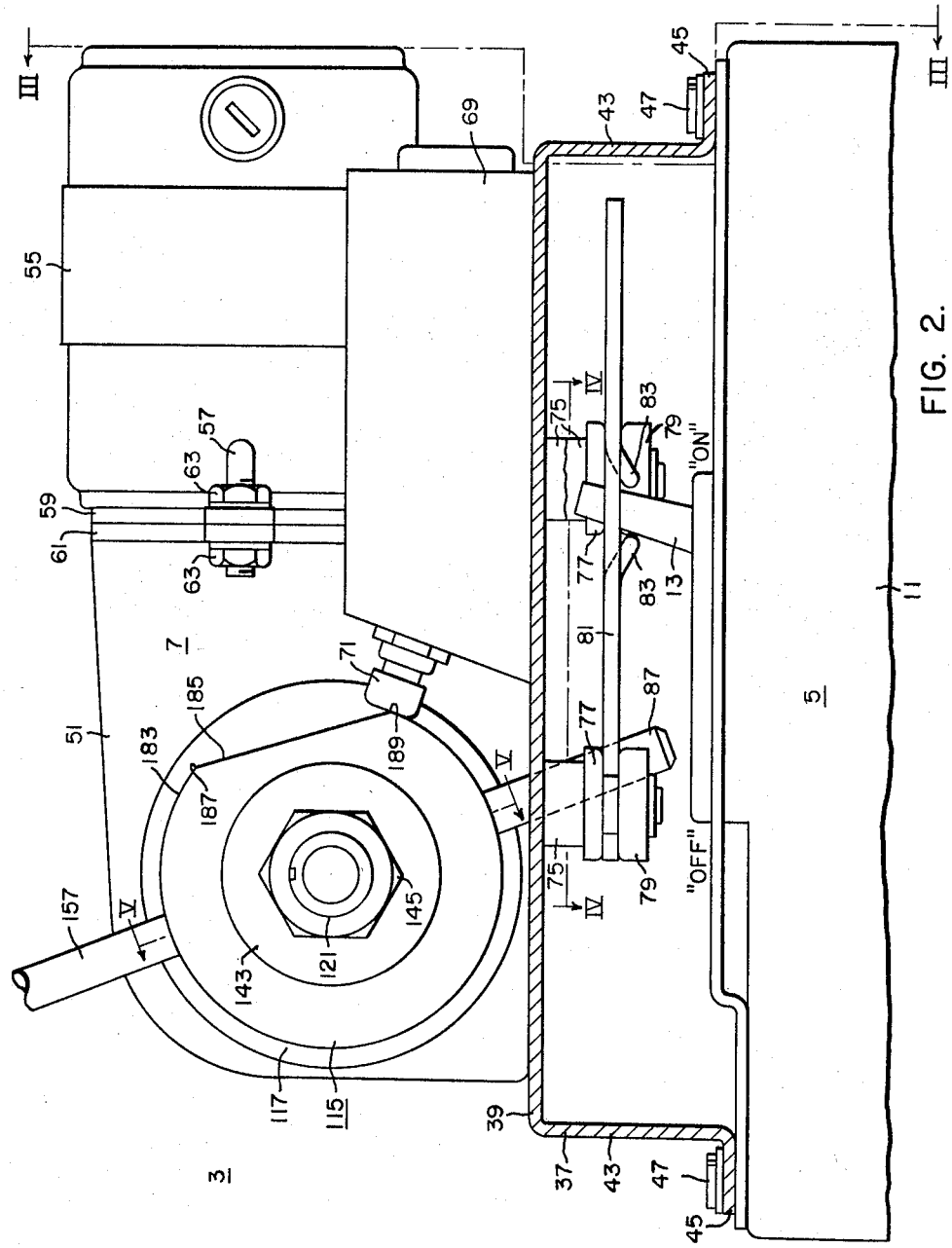
FIG. 2 is a sectional view taken generally along the line II—II of FIG. 1 with only part of the circuit breaker of the combination being shown which circuit-breaker part is shown in side elevation.
Figure 3:
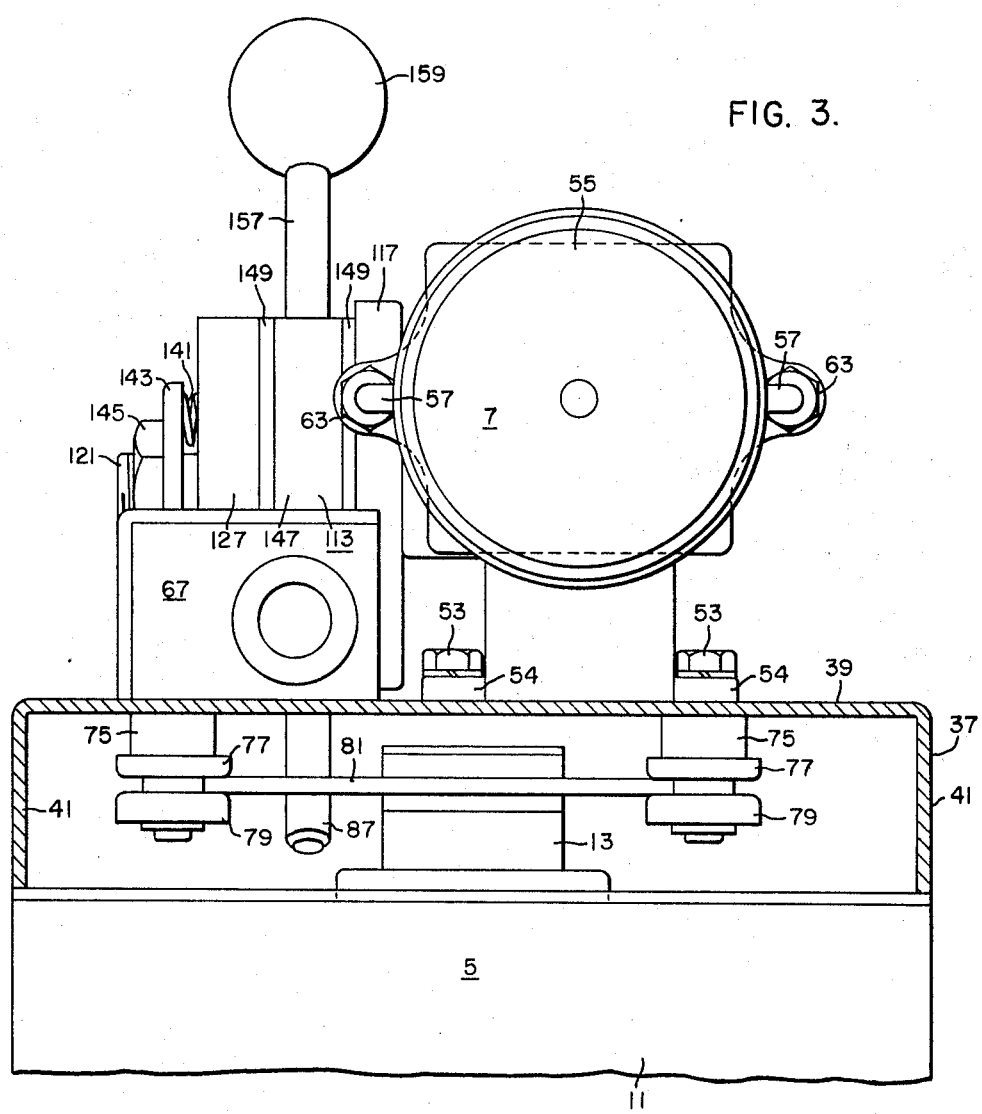
FIG. 3 is a sectional view taken generally along the line III—III of FIGURE 2 with the operating handle being fully shown in FIG. 3 and with the circuit-breaker part being shown in end elevation.

Referring to the drawings and particularly to FIGS. 1–3, there is shown therein a circuit interrupting device 3 comprising a circuit interrupter 5 and a motor operating mechanism 7. The circuit interrupter 5 is a circuit breaker of the type known in the art as a molded-case type circuit breaker. The circuit breaker 5 comprises an insulating housing 11 of molded insulating material and an external handle 13 extending from the housing 11 and manually movable between two operating positions to open and close contacts within the housing 11. The circuit breaker may be of the type shown in the patent to Robert H. Hill et al., Patent No. 3,073,927, issued January 15, 1963. Since the circuit breaker is fully described in the above-mentioned patent, only a schematic drawing and a brief description thereof is given herein.

Figure 6:
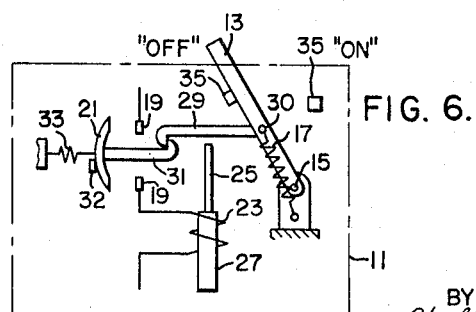
FIG. 6 is a schematic view of the circuit breaker seen in FIGS. 2–4.

As is shown schematically in FIG. 6, the handle 13 of the circuit breaker 5 is moved about a stationary axis or pivot 15 to move a spring 17 overcenter to effect opening and closing of the contacts 19, 21 in a well known manner. When the contacts 19, 21 are in the closed position and an overload current is passed through a coil 23, a plunger 25 of a solenoid 27 is moved to the right (FIG. 6) to pivot a latch member 29 about a pivot 30 to unlatch a contact arm 31 that carries the movable contact 21, whereupon a spring 33 operates to open the contacts 19, 21. The contact 21 is stopped in the open position by means of a stop 32. The circuit breaker is reset by moving the handle 13 to the "off" position to relatch the latch member 29 with the contact arm 31. The circuit breaker is trip-free in that even if the handle 13 is held in the closed position, the circuit breaker will still be tripped open upon the occurrence of a tripping overload current through the breaker. Stop means 35 are provided to limit movement of the handle 13 in both directions.

The motor operating mechanism 7 (FIGS. 1–3) is provided to operate the circuit breaker 5. The motor operating mechanism 7 comprises a metallic supporting plate 37 that is formed to provide a top plate 39, two side walls 41 (FIG. 3) and two end walls 43 (FIG. 2). The top plate, side walls and end walls cooperate with the generally planar front surface of the circuit breaker housing 11 to form an enclosure for the circuit breaker handle 13 and other operating parts that will be hereinafter more specifically described. The supporting plate 37 is provided with flanges 45 (FIGS. 1 and 2) which flanges 45 receive screws 47 that mount the plate 37 to the circuit breaker 5.

A two-part gear housing 51 is supported on the plate 37 by means of four screws 53 (FIGS. 1 and 3) that pass through suitable flange parts 54 of the housing 51 and are threadedly engaged in tapped openings in the top part 39 of the support plate 37. A motor 55 is secured to the gear housing 51 by means of securing means comprising two rod members 57 that are fixedly secured to the motor 55 in a suitable manner. The rod members 57, which are threaded at the outer ends thereof, pass through suitable openings in a first flange member 59 and in a second flange member 61. The second flange member 61 is welded or otherwise fixedly secured to the gear housing 51. Two nuts 63 are threaded on each of the rods 57 on opposite sides of the flange members 59, 61 to fixedly secure and mount the motor 55 on the gear housing 51.

A switch structure 67 comprises a housing 69 that is fixedly secured to the top part 39 of the support member 37. An actuating plunger 71 that is suitably supported for rectilinear reciprocation extends from the housing 69. As will be hereinafter specificially described, the switch structure 67 is a push-push type switch comprising contacts that are operated by depression of the actuating plunger 71.

Figure 4:
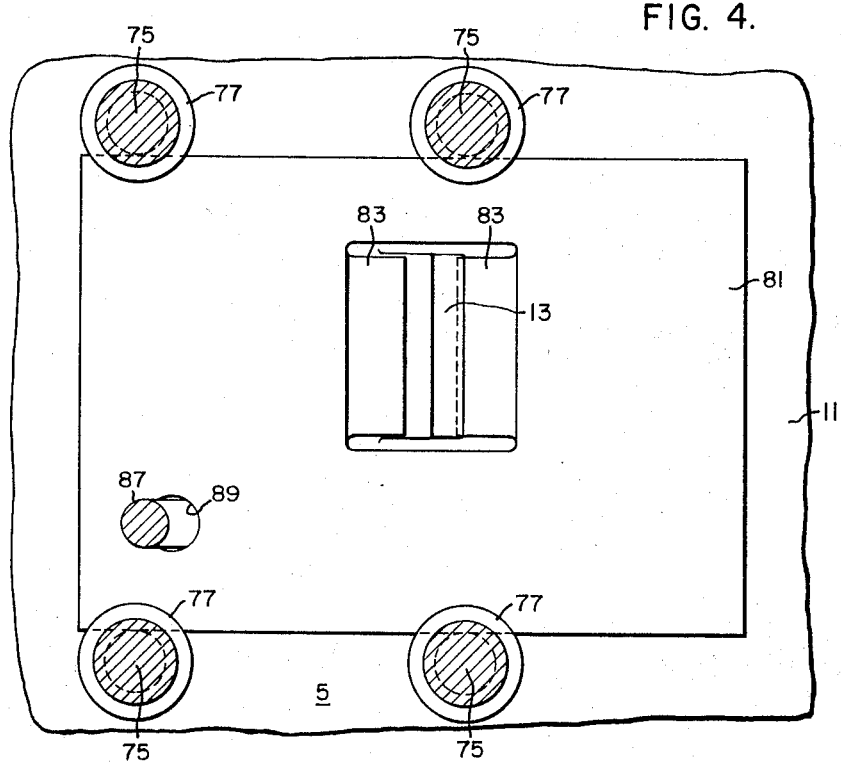
FIG. 4 is a sectional view, with parts broken away, taken generally along the line IV—IV of FIG. 2.

Four stud supports 75 are welded or otherwise fixedly secured to the inside surface of the top part 39 of the support plate 37. Two roller members 77 and 79 are independently rotatably supported in a spaced relationship on each of the studs 75. A flat rigid metallic operating plate 81 is supported for generally planar rectilinear back-and-forth movement by means of the four pairs of rollers 77, 79. The operating plate 81 is machine worked to provide two bent-over tang members 83 forming an opening that receives the operating handle 13 of the circuit breaker 5 to provide an operative connection between the plate 81 and the handle 13 so that rectilinear reciprocal movement of the plate 81 will operate to toggle the circuit breaker handle 13 between the "on" and "off" positions to close and open the contacts of the circuits breaker in a manner to be hereinafter more specifically described. The plate 81 is operatively moved by movement of an operating rod 87 that passes through a suitable opening 89 (FIG. 4) in the plate 81.

Figures 5, 7:
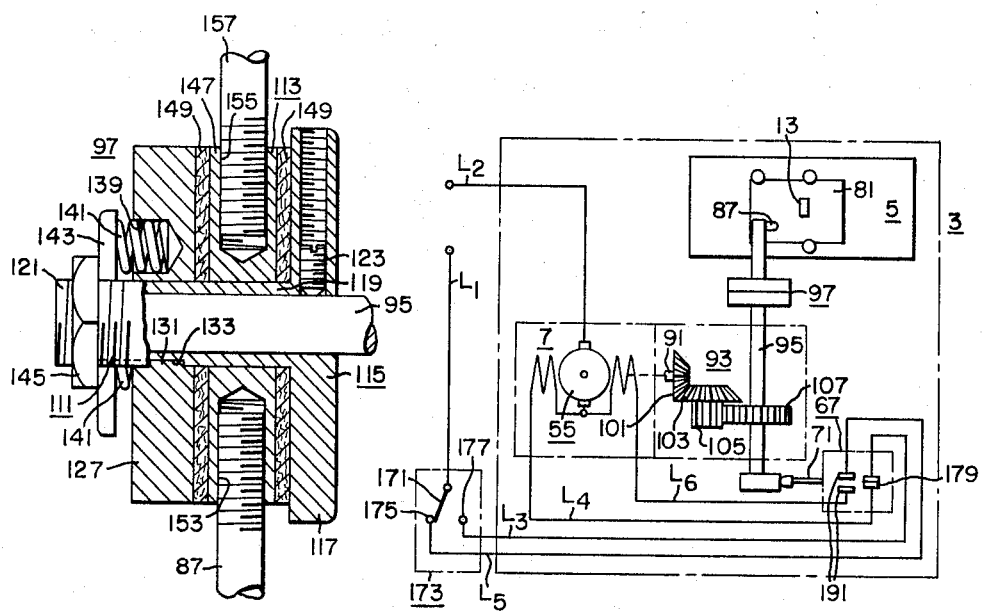
FIG. 5 is a sectional view taken generally along the line V—V of FIG. 2.
FIG. 7 is a diagrammatic view of the structure seen in FIGS. 1–3 ilustrating the control of the circuits for the structure.

Referring to FIG. 7, it will be seen that the motor 55 is energized to operate a drive shaft 91 to thereby operate a gear structure indicated generally at 93 to rotate an operating shaft 95 which rotation operates through a friction clutch structure 97 to operate the operating lever 87. The gear structure 93 comprises a first bevel gear 101 that is rotated to rotate a second bevel gear 103 to thereby rotate a first spur gear 105 to rotate a second spur gear 107 that is connected to rotate the operating shaft 95. The axis of the drive shaft 91 is generally parallel to the plane of movement of the operating plate 81. The axis of the operating shaft 95 is also generally parallel to the plane of movement of the plate 81.

The friction clutch structure 97, which operatively connects the operating shaft 95 with the operating lever 87, is best illustrated in FIG. 5. Referring to FIG. 5, it will be seen that the friction clutch structure 97 comprises a driving clutch structure 111 and a driven clutch structure 113. The driving clutch structure 111 comprises a flanged axle member 115 comprising a tubular flange part 117 and a tubular axle part 119 which parts 117 and 119 are disposed over the shaft 95. The parts 117 and 119 are cast as an integral structure, and the part 119 is externally threaded at 121. A set screw 123 rigidly connects the member 115 with the operating shaft 95. In addition to the member 115, the driving clutch structure 111 comprises a member 127 that fits over the external end of the axle part 119 and is fixedly secured to the part 119 by means of a key portion 131 that is formed integral with the member 127. They key portion 131 fits into a slot 133 in the axle part 119 of the member 115 to secure the members 127 and 115 together for unitary rotation with the operating shaft 95. The member 127 is provided with a plurality of openings 139 spaced around the axle part 119 and a plurality of compression spring members 141 are supported in the openings and biased to a charged condition by means of a spring support 143 that threadedly engages the external end of the axle 119. A lock nut 145 is provided on the threaded external part 121 of the axle 119 to lock the spring support 143 in position. Three spring members 139 disposed each at the apex of an imaginary triangle are satisfactory for effective operation of the friction clutch structure 97. It is to be understood, however, that more or less than three springs 139 could be used to provide the desired spring force. The springs 141 are charged to bias the member 127 toward the flange part 117 of the member 115. This action serves to sandwich a driven member 147 and two friction discs 149, that are disposed over the shaft or axle 119 on opposite sides of the member 147, between the member 127 and the flange part 117 of the member 115 to operatively connect the driven member 147 with the driving structure 111. The friction discs 149, may be of asbestos or other suitable material. The driven member 147 is provided with a first tapped opening 153 therein to receive the operating level 87 that is threaded into the opening 153. The driven member 147 is also provided with a tapped opening 155 therein that receives a threaded rod 157 that is provided with a handle portion 159 (FIGS. 1 and 3) at the outer end thereof to enable manual operation of the circuit interrupting structure 3. The amount of force biasing the members 127, 149, 147, and 117 together is adjusted by rotation of the spring support 143 on the threaded end 121 of the axle part 119 to thereby vary the compression of the springs 141. It is well known that the amount of friction between engaging surfaces is proportional to the amount of force biasing the surfaces together. Thus, the friction clutch structure 97 can be adjusted to provide for positive action of the circuit interrupting structure when any one of a variety of circuit interrupters are used in the combination.

The operating shaft 95 is rotated to rotate the driving clutch structure 111, which structure 111 comprises the members 115 and 127 that are secured together for unitary rotation with the operating shaft 95. Rotation of the driving clutch structure 111 operates through the friction disc or members 149 to rotate the driven member 147 to thereby rotate the member 87 about the axis of the operating shaft 95. As the member 87 moves back and forth (FIG. 2), it moves the operating plate 81 back and forth rectilinearly to thereby move the toggle handle 13 of the circuit breaker 5 between the two operating positions of the circuit breaker to open and close the circuit breaker contacts in a well known manner.

It is noted that the friction discs 149, (FIG. 5), could be eliminated and either the driven member 147 or the driving members 117, 127 could be provided with asbestos or other suitable friction surfaces to provide a friction type coupling means between the driving members 117, 127 and the driven member 147.

The circuit interrupting structure 3 is disclosed in FIGS. 1–3 and 7 in the "on" position in which position the contacts of the circuit breaker 5 are closed. Referring to FIG. 7, when the circuit interrupting structure 3 is mounted and wired for operation, two lines L1 and L2 are connected to a suitable power source. In order to open the contacts of the circuit breaker 5, a switch arm 171 of a switch 173 is moved out of engagement with a contact 175 and into engagement with a contact 177. This closes a circuit from L1 through the switch arm 171, the contact 177, a line L3, a pair of closed contacts 179 in the switch structure 67, a line L4, the motor 55, to the line L2. This energizes the reversible motor 55 to rotate the shaft 91 in a first direction which rotation operates through the gear structure 93, operating shaft 95, friction clutch structure 97, and operating lever 87 to move the operating plate 81 on the roller means 77, 79 to thereby move the operating handle 13 from the "on" (FIG. 2) to the "off" position. As is best seen in FIG. 2, the part 117 of the member 115 is provided with a periphery 183 having a generally flat portion 185. Opposite parts 187 and 189 of the periphery 183 on opposite sides of the flat part 185 serve to operate the operating plunger 71 of the switch structure 67. During the operation when the circuit breaker handle 13 is moved from the "on" position to the "off" position, the member 117 (FIG. 2) moves to move the part 189 thereof away from the plunger 71 whereupon spring means within the switch structure 67 moves the plunger 71 outward from the housing 169. Near the expiration of the operating movement the member 117, the part 187 of the member 117 engages the plunger 71 depressing the plunger 71 which movement serves to open the contacts 179 (FIG. 7) and close a pair of contacts 191 in the switch structure 67. This operation of the switch structure 67 opens the circuit through the motor 55 and prepares another circuit for a closing operation of the circuit breaker. The switch structure 67 is operated by the means of the member 117, that is part of the driving structure actuated by direct linkage with the motor shaft 91, rather than through the friction drive to thereby prevent the possibility of a misalignment of the cam surface 183 that might cut the motor off before the circuit breaker handle 13 has reached the desired position. The motor operating mechanism is adjusted so that the mechanism will move slightly past the position required to operate the handle 13 during which slight additional movement the clutch structure 97 will slip to prevent damage to the handle 13. At the expiration of the opening operation hereinbefore described, with the handle 13 in the "off" position and the switch structure 67 operated to open the contacts 179 (FIG. 7) and close the contacts 191, the braking action of the motor 55, gear structure 93 and friction clutch structure 97 and other moving parts of the circuit controlling structure 3 operate to bring the moving parts to a standstill.

When it is thereafter desired to close the circuit breaker 5, the switch arm 171 (FIG. 7) of the switch 173 is moved out of engagement with the contact 177 and into engagement with the contact 175. This operation closes a circuit from the line L1 through the contact arm 171, the contact 175, a line L5, the contacts 191 that were closed during the previous operation, a line L6, through the motor 55 to the line L2. This operation energizes the reversible motor 55 to rotate the motor shaft 91 in the opposite direction which movement operates through the gears 93, operating shaft 95, friction clutch structure 97 and operating lever 87, to rectilinearly move the operating plate 81 to move the handle 13 from the "off" (FIG. 2) to the "on" position to thereby close the contacts of the circuit breaker. At the end of this movement, the friction clutch structure 97 will slip to permit the driving structure 111 to rotate relative to the driven structure 113 to thereby prevent the application of a damaging force to the operating handle 13 of the circuit breaker 5. During the closing operation, the cam surface 183 of the member 117 (FIG. 2) was also moved to release the plunger 71 of the push-push type switch structure 67 when the part 187 moved away from the member 71. Near the expiration of the closing operation the part 189 (FIG. 2) is moved into engagement with the plunger 71 to depress the plunger 71. This operation of the plunger 71 operates to open the contacts 191 (FIG. 7) deenergizing the motor 55 and close the contacts 179 to prepare the circuit for a subsequent opening operation of the circuit breaker 5. When the motor 55 is deenergized the braking action of the motor 55, gear structure 93, friction clutch 97 and other moving parts operate to bring the moving parts to a standstill.

As was hereinbefore described, the circuit breaker 5 is of the trip-free type in that the contacts of the circuit breaker will be automatically operated to the open position upon the occurrence of a tripping overload even through the handle 13 is held in the "on" position. If an automatic tripping operation of the circuit breaker 5 occurs, the circuit breaker is automatically reset through operation of the switch 173 by operating the circuit controlling structure 3 to operate the circuit breaker 5 to the "off" position. Operation of the circuit breaker 5 to the "off" position automatically resets the operating mechanism of the circuit breaker in a manner well-known in the art.

The circuit breaker is manually operated by operation of the rod 157 that is fixedly secured to the driven member 147. This manual movement of the rod 157 serves to move the operating lever 87 that is also fixedly secured to the driven member 147 to thereby move the operating plate 81 to operate the handle 13. During this movement, the other parts of the friction clutch 97, gear structure 93, the motor shaft 91 and rotor (not shown) will also move with the movement of the driven member 147 because the frictional engagement between the driven member 147 and driving members 111 is enough to overcome the drag of these members. It is to be noted that the gear structure 93 is reversible in that the shaft 91 can be rotated to operate the gear structure 93 to rotate the shaft 95 or the shaft 95 can be rotated to operate the gear structure 93 to rotate the shaft 91.

As was previously described, in order to assure that the handle 13 will always be moved completely to the operating position, the member 117 (FIG. 2) which is linked directly to the motor shaft 91 through the operating shaft 95 and gear structure 93, is rotated during each motor operation an additional movement to a position slightly past the position that moves the member 13 to the full operating position, and it is only after this additional movement that the high point (187 or 189 FIG. 2) on the cam surface of the member 117 will actuate the switch 71 to open the energizing circuit. During this additional movement, the driving structure 111 slips relative to the driven structure 147 (FIG. 5). During manual operation of the circuit controlling structure, the handle 13 will reach the operating position prior to the time that the high part (187 or 189 FIG. 2) on the cam surface of the member 117 will operate the switch arm or plunger 71. Thus, if the circuit controlling structure 3 is operated manually from a first position to the second position and then manually operated back to the first position, the parts will be brought back to the original position and the parts of the circuit controlling structure will be in position for a subsequent motor operation.

If, however, the circuit controlling structure is manually operated from a first to the second position and if it is desired to then operate the circuit breaker by means of the motor 55, two motor operations will be required. When the structure is manually operated from a first to the second position the manual operation will be completed and the member 147 and rod 157 will be stopped at the end of this manual operation when the handle 13 stops to thereby stop the member 117 before the member 117 reaches the position depressing the plunger 71. This is because the parts will only be moved to the distance required to move the handle 13 to the other operating position and the additional movement (that additional movement hereinbefore described during the motor operations when the driving structure 111 moves relative to the driven structure at the end of each motor operation) does not occur during manual operations. Thus, the plunger 71 of the switch structure 67 will not be operated by the high part (187 or 189) of the member 117 during manual operations because the member 117 will stop just short of the high part so that after a single manual operation two successive motor operations will be necessary in order to effectively operate the circuit controlling structure to open or close the breaker. The first motor operation will move the member 117 the additional distance to operate the plunger 71 to operate the switch structure 67 to prepare the circuit through the switch structures 67 for the subsequent motor operation. The subsequent motor operation will operate to operate the circuit breaker in the same manner as was hereinbefore specifically described.

Figure 8:
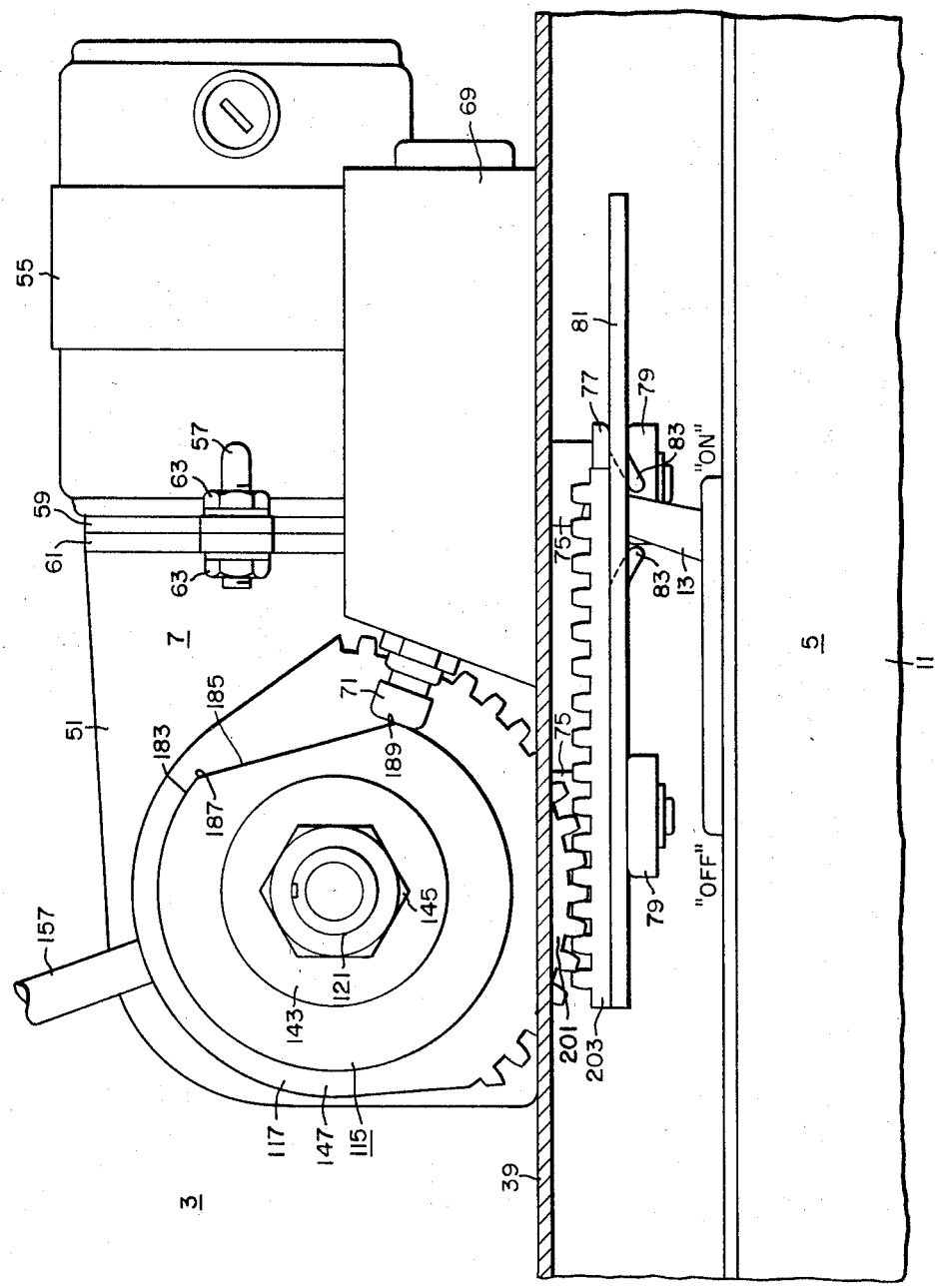
FIG. 8 is partial view similar to FIG. 2 illustrating a modified form of the invention.

Another embodiment of the invention is disclosed in FIGURE 8 wherein the member 147 is provided with a pinion lower part 201 that is cast or formed as an integral structure with the member 147. The pinion 201 cooperates with a rack plate 203 that is welded or otherwise fixedly secured to the upper surfaces of the operating plate 81. Otherwise, the structure disclosed in FIG. 8 is the same as that hereinbefore disclosed in the first embodiment (FIGS. 1–7) and the parts of the structure of FIG. 8 that are the same as parts of the first embodiment are identified by the same reference characters that were hereinbefore used to identify the parts of the first embodiment. The rack and pinion 203 may be used, for example, in applications where it is desirable to operate circuit breakers that require a greater amount of operating force.

As was previously described, the friction clutch can be adjusted in order to provide enough friction for effective operation but not so much friction that the handle 13 will be broken or the motor stalled during operation of the circuit controlling structure 3. The adjustment feature also provides that the motor operating mechanism can be used with different circuit interrupters or circuit breakers that require a different operating force for effective operation. With the provision of a friction clutch, the motor operating mechanism can be constructed to drive a greater distance than the handle travel of the circuit breaker. Thus, the driving distance of the mechanism is less critical so that the mechanism can be field mounted to effectively operate a variety of different circuit interrupters. The improved compactly constructed motor operating mechanism has been illustrated and described in combination with a molded-case type circuit breaker having an external operating handle. The mechanism has an additional advantage when used in this combination because it can be readily connected to the circuit breaker handle when the mechanism is mounted on top of the generally planar front part of the circuit breaker. Thus, the combination can be made with a variety of different standard molded-case circuit breakers. It is to be understood, however, that the motor operating mechanism can also be advantageously used in combination with many other types of circuit breakers and switches and also with various other forms of circuit interrupters.

While the invention has been disclosed in accordance with the provisions of the patent statutes, it is to be understood that various changes in the structure or details thereof may be made without departing from the spirit and scope of the invention. It is desired, therefore, that the language of the appended claims be given the broadest reasonable interpretation permissible in the light of the prior art.

I claim as my invention:

1. A motor operating mechanism for operating a circuit interrupter, said circuit interrupter having an operating member movable between two operating positions, said motor operating mechanism comprising an operating structure supported for generally rectilinear reciprocal movement, means operatively connecting said operating structure with said operating member, a motor, a drive shaft operated by operation of said motor, friction clutch means operatively connecting said drive shaft with said operating structure, and upon operation of said motor said drive shaft operating through said friction clutch means to operatively move said operating structure to thereby operatively move said operating member, and said friction clutch means slipping to prevent the application of a damaging force to said operating member.

2. A motor operating mechanism for operating a circuit interrupter, said circuit interrupter having an operating member movable between two operating positions and stop means stopping said operating member at each of said operating positions, a friction clutch comprising a driving clutch structure and a driven clutch structure, an operating plate supported for reciprocal generally planar movement and operatively connected to said operating member, means operatively connecting said driven clutch structure with said operating plate, means operatively connecting said driving clutch structure with said motor, said motor operating through said driving clutch structure to drive said driven clutch structure to thereby move said operating plate to operate said operating member, said motor operating mechanism being operable to reciprocate said operating member between said operating positions, and when said operating member engages said stop means at each of said operating positions said friction clutch slipping to prevent the application of a damaging force to said operating member.

3. A motor operating mechanism for operating a circuit interrupter, said circuit interrupter having an operating member movable between two operating positions, said mechanism comprising an operating plate supported for generally rectilinear reciprocal movement, means operatively connecting said operating plate with said operating member, said operating plate comprising a generally flat member movable along a first plane, a motor, a drive shaft rotatable about a first axis generally parallel to said first plane, a gear structure operatively connected to said drive shaft, an operating shaft operatively connected to said gear structure and rotatable about a second axis generally parallel to said first plane, a friction clutch structure comprising a driving friction member and a driven friction member both of which friction members are rotatable about said second axis, upon energization of said motor said drive shaft operating through said gear structure to rotate said operating shaft to thereby operate said friction clutch structure to operate said operating lever to thereby move said operating plate to operate said operating member from one to the other of said operating positions, and said friction clutch structure being adapted to slip to prevent the application of a damaging force to said operating member.

4. A motor operating mechanism for operating a circuit interrupter, said circuit interrupter having an operating member movable between two operating positions, said motor operating mechanism comprising an operating shaft rotatable about a first axis, means operatively connecting said operating shaft for rotation upon energization of said motor, a friction clutch structure comprising a driving structure rotatable about said first axis and a driven structure rotatable about said first axis, friction means operatively connecting said driving structure with said driven structure, rack-and-pinion connecting means operatively connecting said driven structure with said operating member, said rack-and-pinion connecting means comprising a pinion structure rotatable with said driven structure and a rack plate operatively connected to said pinion structure, means supporting said rack plate for rectilinear reciprocal movement, means connecting said rack plate with said operating member, upon rotation of said operating shaft said friction clutch structure operating through said rack-and-pinion connecting means to operate said operating member from one to the other of said positions, and said driving structure slipping relative to said driven structure when said operating member reaches said other operating position to thereby prevent the application of a damaging force to said operating member.

5. A motor operating mechanism for operating a circuit interrupter, said circuit interrupter having an operating member movable between two operating positions, said motor operating mechanism comprising an operating shaft rotatable about a first axis, means operatively connecting said operating shaft for rotation upon energization of said motor, a friction clutch structure comprising a driving structure rotatable about said first axis and a driven structure rotatable about said first axis, friction means operatively connecting said driving structure with said driven structure, rack-and-pinion connecting means operatively connecting said driven structure with said operating member, said rack-and-pinion connecting means comprising a pinion structure rotatable with said driven structure and a rack plate operatively connected to said pinion structure, means supporting said rack plate for rectilinear reciprocal movement, means connecting said rack plate with said operating member, upon rotation of said operating shaft said friction clutch structure operating through said rack-and-pinion connecting means to operate said operating member from one to the other of said positions, said driving structure slipping relative to said driven structure when said operating member reaches said other operating position to thereby prevent the application of a damaging force to said operating member, and means manually operable to adjust the frictional force characteristic of said friction clutch structure.

6. A top-mounted type motor operating mechanism for operating a circuit interrupter, said operating mechanism comprising a supporting plate structure, a generally flat operating plate supported on a first side of said supporting plate structure, means supporting said operating plate for endwise rectilinear movement along a first plane, means for operatively connecting said operating plate with said operating member, a motor operating device supported on the side of said supporting plate that is opposite said first side and comprising a motor, a drive shaft operatively connected to said motor, gear means operatively connecting said drive shaft with an operating shaft, said operating shaft and said drive shaft each being rotatable about a separate axis each of which separate axis is disposed generally parallel to said first plane, a friction clutch structure supported on said operating shaft and comprising a driving clutch structure and a driven clutch structure, frictional engaging means operatively connecting said driving clutch structure and said driven clutch structure, means operatively connecting said driven clutch structure with said operating plate, and said driving clutch structure being adapted to slip relative to said driven clutch structure when said operating member reaches said operating positions.

7. A top-mounted type motor operating mechanism for operating a circuit interrupter, said operating mechanism comprising a supporting plate structure, a generally flat operating plate supported on a first side of said supporting plate structure, means supporting said operating plate for endwise rectilinear movement along a first plane, means for operatively connecting said operating plate with said operating member, a motor operating device supported on the side of said supporting plate that is opposite said first side, said motor operating device comprising a motor, a drive shaft operatively connected to said motor, gear means operatively connecting said drive shaft with an operating shaft, said operating shaft and said drive shaft each being rotatable about a separate axis each of which separate axis is disposed generally parallel to said first plane, a friction clutch structure supported on said operating shaft and comprising a driving clutch structure and a driven clutch structure, frictional engaging means operatively connecting said driving clutch structure and said driven clutch structure, said operating plate comprising a rack plate, pinion means movable with said driven clutch structure and cooperating with said rack operating plate to operatively connect said driven clutch structure with said rack operating plate, and said driving clutch structure being adapted to slip relative to said driven clutch structure when said operating member reaches said operating positions.

References Cited by the Examiner
UNITED STATES PATENTS 3,198,908 8/1965 Staak _____ 200—92
3,213,235 10/1965 Soos _____ 200—92

BERNARD A. GILHEANY, *Primary Examiner.*

R. N. ENVALL, Jr., *Assistant Examiner.*